US008824436B2

(12) United States Patent
Flore et al.

(10) Patent No.: US 8,824,436 B2
(45) Date of Patent: Sep. 2, 2014

(54) METHOD AND APPARATUS FOR SOFT MIGRATION OF FREQUENCY SPECTRUM BLOCKS

(75) Inventors: Oronzo Flore, Ostuni (IT); Peter Gaal, San Diego, CA (US); Mungal Singh Dhanda, Slough (GB); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 13/110,810

(22) Filed: May 18, 2011

(65) Prior Publication Data

US 2011/0286408 A1 Nov. 24, 2011

Related U.S. Application Data

(60) Provisional application No. 61/346,348, filed on May 19, 2010.

(51) Int. Cl.
*H04W 4/00* (2009.01)
*H04L 5/00* (2006.01)
*H04W 16/14* (2009.01)
*H04W 16/02* (2009.01)

(52) U.S. Cl.
CPC .............. *H04L 5/0007* (2013.01); *H04L 5/001* (2013.01); *H04W 16/14* (2013.01); *H04W 16/02* (2013.01)
USPC ........... 370/338; 370/329; 370/330; 370/331; 455/422.1; 455/432.1; 455/412

(58) Field of Classification Search
USPC ......... 370/328–331, 336–339, 341–345, 437, 370/480–482, 491; 455/412, 168.1, 188.1, 455/418, 422.1, 432.1, 432.3, 434, 455/435.1–435.3, 436, 440, 444, 450, 455/452.1–452.2
See application file for complete search history.

(56) References Cited

U.S. PATENT DOCUMENTS

2009/0268831 A1  10/2009  Onggosanusi et al.
2010/0216478 A1*  8/2010  Buddhikot et al. ........... 455/450

FOREIGN PATENT DOCUMENTS

WO  WO 2008088253 A1 *  7/2008

OTHER PUBLICATIONS

Alcatel-Lucent: "Recommendations on lower LTE bandwidth options (< 5 MHz) for GSM/CDMA migration",3GPP Draft;R4-070616,3rd Generation Partnership Project (3GPP), TSG-RANWG4,Kobe, Japan, May 7-11, 2007.*

(Continued)

*Primary Examiner* — Kibrom T Hailu
*Assistant Examiner* — Zewdu A Beyen
(74) *Attorney, Agent, or Firm* — John J. Ketchum

(57) ABSTRACT

Techniques are provided for efficient allocation of frequency spectrum blocks. In one example, there is provided a method, operable by one or more network entities, for reallocating a portion of a first frequency band allocated to a first radio access technology (RAT) to a second RAT. The method may involve determining a migration block granularity for reallocating the portion of the first frequency band to the second RAT. The method may involve identifying spectrum block(s) of the determined granularity in the first frequency band. The method may involve aggregating the identified spectrum block(s) with a native carrier in a second frequency band allocated to the second RAT. The method may involve controlling of the aggregated spectrum block(s) via the native carrier for the second RAT.

28 Claims, 14 Drawing Sheets

(56) References Cited

OTHER PUBLICATIONS

Ericsson: "LTE spectrum migration", 3GPP Draft; R4-070171, 3rd Generation Partnership Project (3GPP), Mobile Competence Centre ; 650, Route Des Lucioles ; F-06921 Sophia-Antipolis Cedex ; France, vol. RAN WG4, no. St. Louis, MO; Feb. 20, 2007, XP050176649, [retrieved on Feb. 20, 2007].

Huawei: "Component carrier types for LTE-Advanced", 3GPP Draft; R4-100536, 3rd Generation Partnership Project (3GPP), Mobile Competence Centre ; 650, Route Des Lucioles ; F-06921 Sophia-Antipolis Cedex ; France, vol. RAN WG4, no. San Francisco, USA; 20100222, Feb. 16, 2010, XP050426003, [retrieved on Feb. 16, 2010].

International Search Report and Written Opinion—PCT/US2011/037234, ISA/EPO—Oct. 17, 2011.

Parkvall S et al., "LTE-Advanced—Evolving LTE towards IMT-Advanced", Vehicular Technology Conference, 2008, VTC 2008-FALL, IEEE 68th, IEEE, Piscataway, NJ, USA, Sep. 21, 2008, pp. 1-5, SP031352496, ISBN: 978-1-4244-1721-6.

Rapeepat Ratasuk et al., "Carrier Aggregation in LTE-Advanced", 2010 IEEE Vehicular Technology Conference (VTC 2010-Spring)—May 16-19, 2010—Taipei, Taiwan, IEEE, US, May 16, 2010, pp. 1-5, XP031696127, ISBN: 978-1-4244-2518-1.

* cited by examiner

METHOD AND APPARATUS FOR SOFT MIGRATION OF FREQUENCY SPECTRUM BLOCKS

CLAIM OF PRIORITY UNDER 35 U.S.C. §119

The present application for patent claims priority to Provisional Application No. 61/346,348 filed May 19, 2010, entitled "SOFT MIGRATION OF FREQUENCIES TO LONG TERM EVOLUTION," which is assigned to the assignee hereof, and is hereby expressly incorporated in its entirety by reference herein.

BACKGROUND

I. Field

The present disclosure relates generally to communication systems, and more specifically to frequency spectrum allocation.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

With the continued advance and adoption of wireless communication technologies, including but not limited to newer releases of UMTS (e.g., LTE and LTE-Advanced (LTE-A)), there may be a diversity of radio access technologies (RATs) implanted in any given wireless communication environment. At the same time, certain legacy or existing RATs will gradually be phased out over time, and certain new RATs will be phased in. In this context, there is a need for enabling network entities to efficiently reallocate frequency spectrum blocks allocated for an existing RAT to a new RAT, and thereby achieve soft migration from the existing RAT to the new RAT such that an increasing amount of the frequency spectrum can be re-used by the new RAT over time.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with methods for efficient reallocation of a portion of a first frequency band allocated to a first radio access technology (RAT) to a second RAT (i.e., soft migration from the first RAT to the second RAT). For example, the method may involve determining a migration block granularity for reallocating the portion of the first frequency band to the second RAT. The method may involve identifying at least one non-contiguous spectrum block of the determined granularity in the first frequency band. The method may involve aggregating the identified at least one non-contiguous spectrum block with a native carrier in a second frequency band allocated to the second RAT. The method may involve controlling the aggregated at least one spectrum block via the native carrier for the second RAT. In related aspects, controlling may involve providing grant/control information to a user equipment (UE) for obtaining UE data, wherein the control information comprises at least one scheduling grant or the like. In further related aspects, one or more electronic devices (e.g., at least one network entity or at least one component thereof) may be configured to execute the above described methodology.

In accordance with one or more embodiments and corresponding disclosure thereof, various aspects are described in connection with a general method for soft migration of RATs. The method may involve deciding to migrate from a first RAT to a second RAT. The method may involve controlling non-contiguous spectrum blocks that have a granularity, wherein the first RAT comprises the non-contiguous spectrum blocks. The method may involve migrating or facilitating migration to the second RAT. In related aspects, one or more electronic devices (e.g., at least one network entity or at least one component thereof) may be configured to execute the above described methodology.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Techniques for detachment from a wireless network are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (Wi-Fi), Hiperlan, etc.

The techniques described herein may be used for the wireless networks and radio technologies mentioned above as well as other wireless networks and radio technologies. For clarity, certain aspects of the techniques are explained in the exemplary context of 3GPP networks, and more particularly in the context of the reallocation of frequency spectrum blocks from an existing RAT (e.g., GSM) to a newer RAT (e.g., LTE). The word "exemplary" is used herein to mean "serving as an example, instance, or illustration." Any embodiment described herein as "exemplary" is not necessarily to be construed as preferred or advantageous over other embodiments.

Figure 1A:
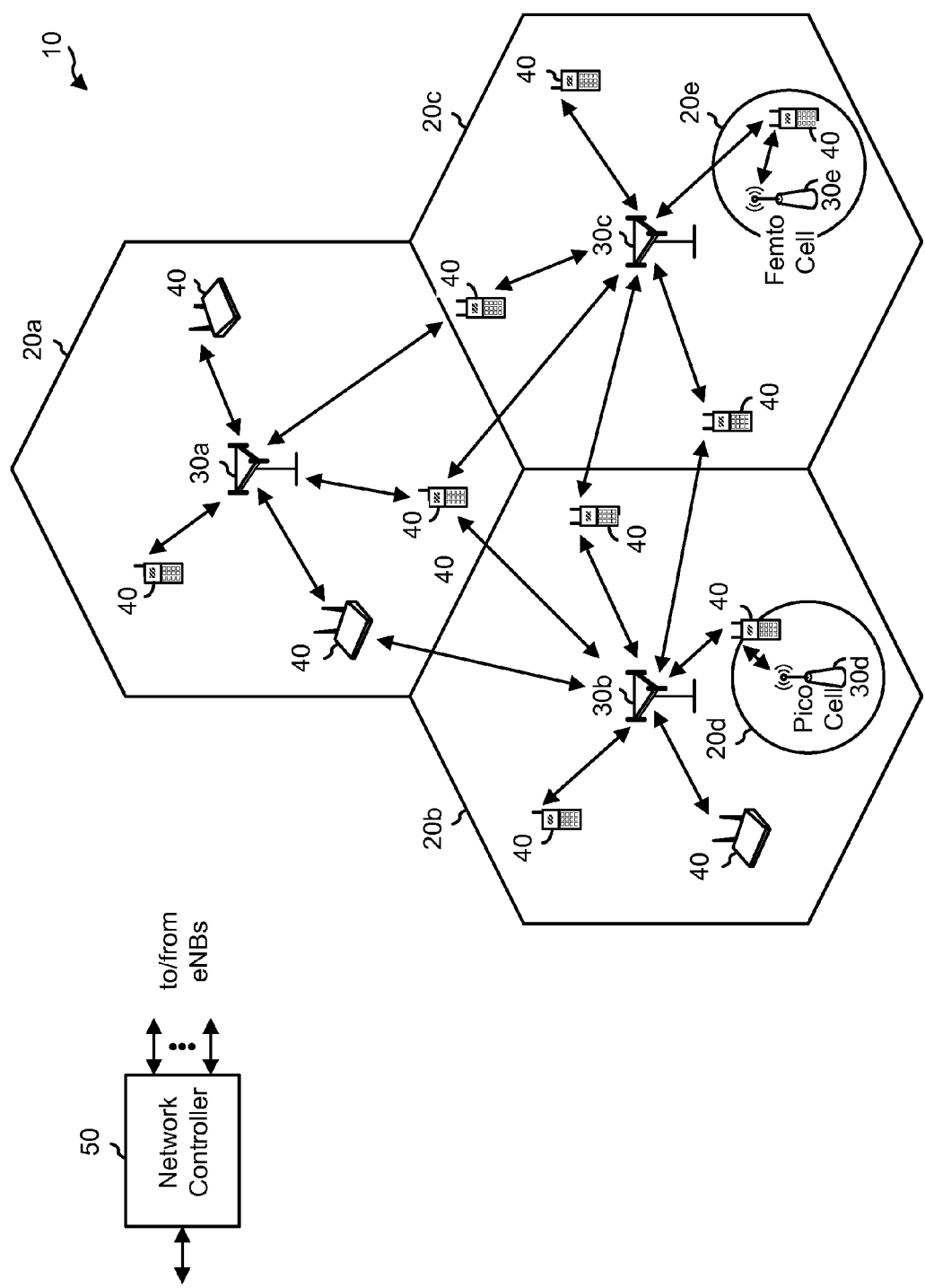
FIG. 1A shows a wireless communication network.

FIG. 1A shows a wireless communication network 10, which may be an LTE network or some other wireless network. Wireless network 10 may include a number of evolved Node Bs (eNBs) 30 and other network entities. An eNB may be an entity that communicates with mobile entities (e.g., user equipment (UE)) and may also be referred to as a base station, a Node B, an access point, etc. Although the eNB typically has more functionalities than a base station, the terms "eNB" and "base station" are used interchangeably herein. Each eNB 30 may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 30a, 30b, and 30c may be macro eNBs for macro cell groups 20a, 20b, and 20c, respectively. Each of the cell groups 20a, 20b, and 20c may include a plurality (e.g., three) of cells or sectors. An eNB 30d may be a pico eNB for a pico cell 20d. An eNB 30e may be a femto eNB or femto access point (FAP) for a femto cell 20e.

Wireless network 10 may also include relays (not shown in FIG. 1). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 50 may couple to a set of eNBs and may provide coordination and control for these eNBs. Network controller 50 may include a single network entity or a collection of network entities. Network controller 50 may communicate with the eNBs via a backhaul. The eNBs may also communicate with one another, e.g., directly or indirectly via a wireless or wireline backhaul.

UEs 40 may be dispersed throughout wireless network 10, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 10 may support operation on a single carrier or multiple carriers for each of the downlink and uplink. A carrier may refer to a range of frequencies used for communication and may be associated with certain characteristics. Operation on multiple carriers may also be referred to as multi-carrier operation or carrier aggregation. A UE may operate on one or more carriers for the downlink (or downlink carriers) and one or more carriers for the uplink (or uplink carriers) for communication with an eNB. The eNB may send data and control information on one or more downlink carriers to the UE. The UE may send data and control information on one or more uplink carriers to the eNB. In one design, the downlink carriers may be paired with the uplink carriers. In this design, control information to support data transmission on a given downlink carrier may be sent on that downlink carrier and an associated uplink carrier. Similarly, control information to support data transmission on a given uplink carrier may be sent on that uplink carrier and an associated downlink carrier. In another design, cross-carrier control may be supported. In this design, control information to support data transmission on a given downlink carrier may be sent on another downlink carrier (e.g., a base carrier) instead of the given downlink carrier.

Wireless network 10 may support carrier extension for a given carrier. For carrier extension, different system bandwidths may be supported for different UEs on a carrier. For example, the wireless network may support (i) a first system bandwidth on a downlink carrier for first UEs (e.g., UEs supporting LTE Release 8 or 9 or some other release) and (ii) a second system bandwidth on the downlink carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 10 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize frequency division duplex (FDD) or time division duplex (TDD). For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods.

Figure 1B:
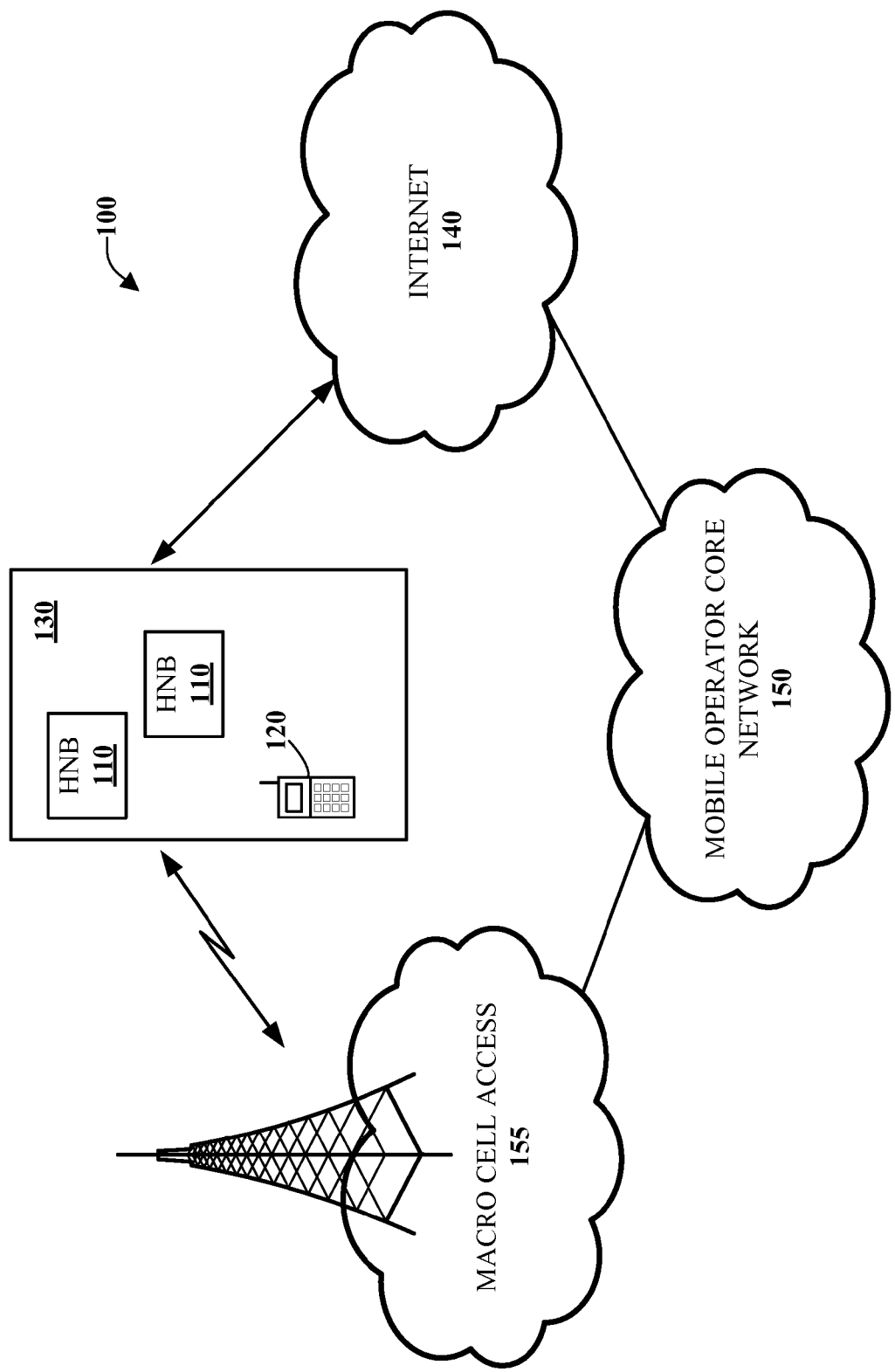
FIG. 1B illustrates a planned or semi-planned wireless communication environment.

FIG. 1B is an illustration of a planned or semi-planned wireless communication environment 100, in accordance with various aspects. Communication environment 100 includes multiple access point base stations, including Home Node Bs (HNBs) 110, each of which are installed in corresponding small scale network environments. Examples of small scale network environments can include user residences, places of business, indoor/outdoor facilities 130, and so forth. The HNBs 110 can be configured to serve associated UEs 120 (e.g., included in a CSG associated with HNBs 110), or optionally alien or visitor UEs 120 (e.g., UEs that are not configured for the CSG of the HNB 110). Each HNB 110 is further coupled to the Internet 140 and a mobile operator core network 150 via a DSL router, a cable modem, a broadband over power line connection, a satellite Internet connection, or the like.

To implement wireless services via HNBs 110, an owner of the HNBs 110 subscribes to mobile service offered through the mobile operator core network 150. Also, the UE 120 can be capable to operate in a macro cellular environment and/or in a residential small scale network environment, utilizing various techniques described herein. Thus, at least in some disclosed aspects, HNB 110 can be backward compatible with any suitable existing UE 120. Furthermore, in addition to the macro cell mobile network 155, UE 120 is served by a predetermined number of HNBs 110, specifically HNBs 110 that reside within a corresponding user residence(s), place(s) of business, or indoor/outdoor facilities 130, and cannot be in a soft handover state with the macro cell mobile network 155 of the mobile operator core network 150. It should be appreciated that although aspects described herein employ 3GPP terminology, it is to be understood that the aspects can also be applied to various technologies, including 3GPP technology (Release 99 [Rel99], Rel5, Rel6, Rel7), 3GPP2 technology (1xRTT, 1xEV-DO Rel0, RevA, RevB), and other known and related technologies.

Figure 2:
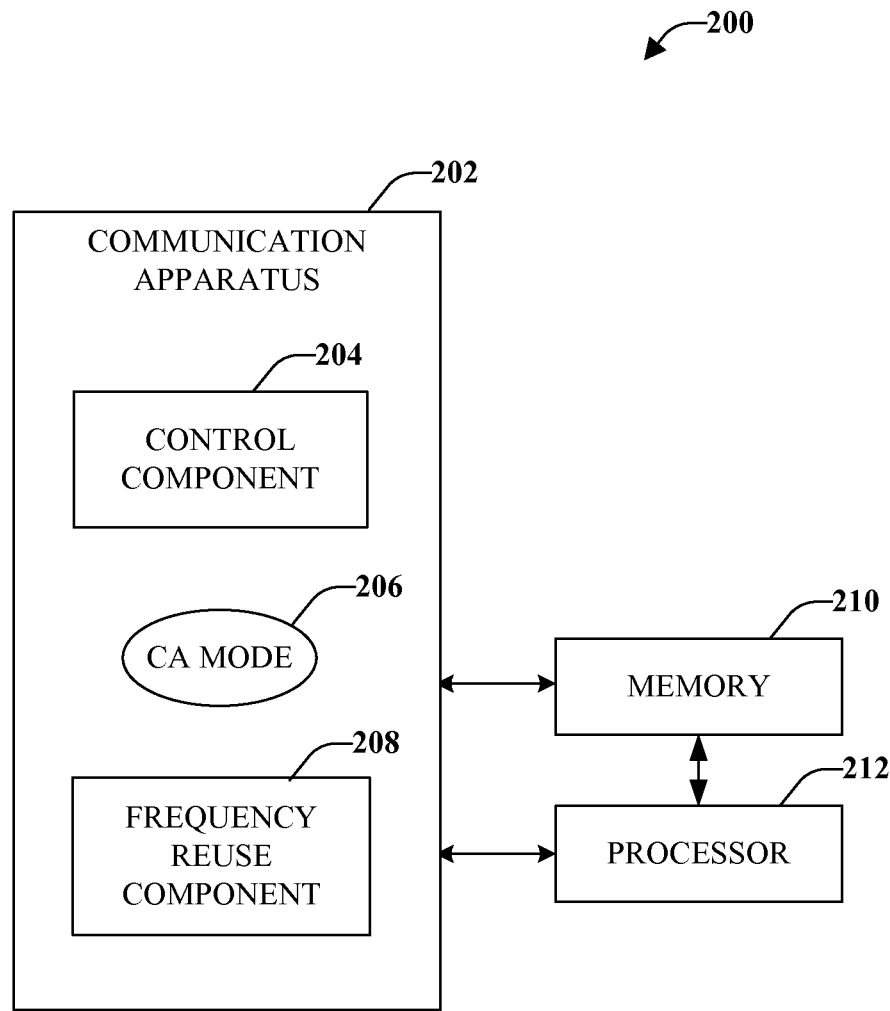
FIG. 2 illustrates an embodiment of a system for providing efficient use of frequency bands.

With reference to FIG. 2, illustrated is a system 200 that can provide more efficient use of frequency bands, according to an aspect of this disclosure. System 200 can be implemented in various communications technologies and can include a plurality of nodes or communications apparatuses, wherein a single communication apparatus 202 is illustrated in FIG. 2 for purposes of simplicity. For example, system 200 may be implemented by network (e.g., 3GPP) operators deploying a new RAT (e.g., LTE or the like) to coexist with previously deployed RATs (e.g., GSM or the like), resulting in multiple deployed RATs, such as GSM, WCDMA, LTE, etc. Supporting multiple RATs can be expensive and can have other undesired consequences. Moreover, with the improved features and data transfer speed typically associated with newer RATs over older RATs, more consumers will replace UEs that are limited to older RATs with UEs that are compatible with the newer RATs. As more users move away from the use of UEs that rely on a first (older, existing) RAT, the numbers of users of the blocks/chunks of the frequency spectrum allocated to the first RAT will decline. As such, less spectrum will needed to support the first RAT users, and it will be greatly beneficial to reclaim, refarm, or reallocate chunks of the frequency spectrum originally allocated for the first RAT to a second (newer, more recently deployed) RAT.

In related aspects, the apparatus 202 may include at least one base station, E-UTRA network element, at least one Evolved Packet Core (EPC) network element, or the like, or combinations thereof. In related aspects, the at least one E-UTRA network element may include an eNB or component(s) thereof. In further related aspects, the EPC network element may include a mobility management entity (MME), a home subscriber server (HSS), a policy charging and rules function (PCRF) server, a serving gateway (SGW), and/or a packet data network (PDN) gateway (PGW), or component(s) thereof.

In further related aspects, GSM is an example a legacy or existing RAT. Currently, reasonable options for operators to reallocate portion(s) of the frequency spectrum allocated to GSM include moving the 5 MHz spectrum as chunks of spectrum, wherein different chunks are moved at any time. For High-Speed Packet Access (HSPA), moving chunks of 5 MHz spectrum may be the only option. For LTE, a 1.4 MHz operation can be considered; however, this can be inefficient due to the higher control channel overhead.

A granularity of 5 MHz makes the process of moving from GSM to LTE cumbersome and slow. For example, GSM spectrum allocation can be fragmented and might not be easy to fit into 5 MHz channels. Further, operators might need to wait until GSM-only devices currently in operation has reduced in number (e.g., as more devices are transitioned away from GSM as the devices are replaced). In related aspects, a fraction of the GSM spectrum may become available because the operator(s) migrate voice users from a first, older RAT (e.g., GSM) to its 3G (circuit-switched voice) and/or LTE (voice over LTE) networks, wherein the operator may have 3G and/or LTE networks with similar footprints to its GSM network.

For example, there are about two and a half billion GSM-only mobile phones in the world. This number might need to be lower before twenty-five GSM channels (e.g., one channel is about 200 KHz and therefore twenty-five channels are about 5 MHz) are made available (e.g., 200 simultaneous voice calls in a given area). When an operator has remaining only 5 MHz of GSM section, the problem can increase, since the operator should wait until there are very few legacy GSM-only devices before the operator can eliminate the GSM service. Thus, while waiting for the twenty-five GSM channels to be cleared, the spectrum will be underutilized. Reducing the granularity (i.e., reducing the size) of the blocks/chunks of spectrum that are cleared for reallocation/refarming can increase the rate and efficiency with which a portion of the frequency spectrum allocated for a first, older RAT gets reallocated for a second, newer RAT. By reducing the size of the blocks to be reallocated away from the first RAT and to second RAT, it will not be necessary to wait to move a large block; rather, smaller blocks may be reallocated sooner. In other words, reduced granularity of the blocks to be reallocated results in a technique that involves reallocating smaller chunks of the spectrum sooner (i.e., little by little), rather than waiting to reallocate portions of the frequency spectrum large block by large block. The one or more disclosed aspects can be utilized to allow migration away from the GSM spectrum, for example, with a granularity of less than 5 MHz. In accordance with some aspects, the migration away from the GSM spectrum can occur with a granularity around 200 KHz (e.g., one GSM channel).

Figures 3A, 3B:
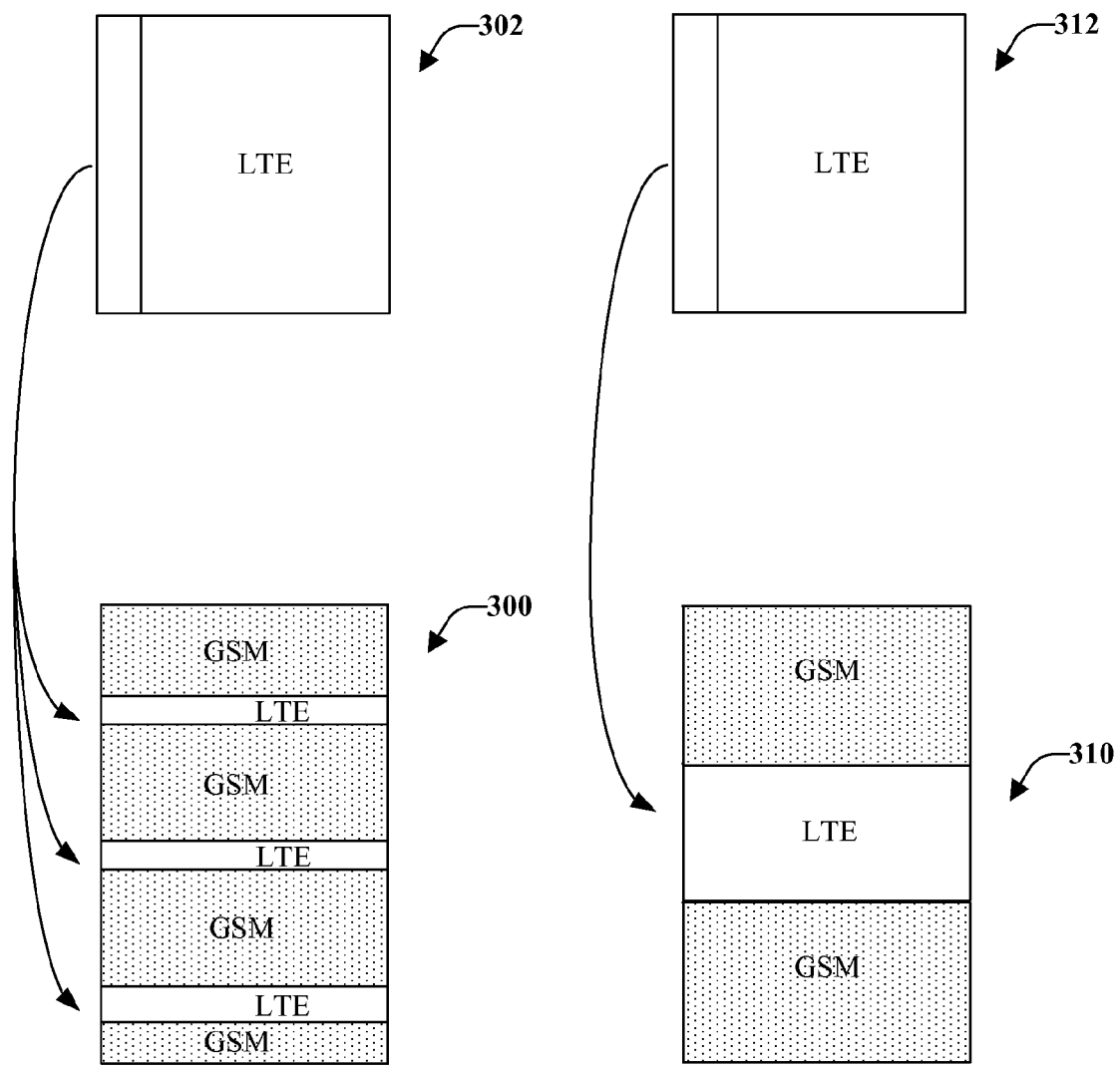
FIG. 3A-B provides a schematic representation of non-contiguous channel aggregation.

For example, FIG. 3A illustrates a schematic representation of different frequency bands and non-contiguous channel aggregation. Illustrated are a first frequency band 300 and a second frequency band 302. First frequency band 300 and second frequency band 302 are different bands. GSM (represented by the dotted blocks) is deployed in first frequency band 300 and LTE (represented by un-shaded blocks) is deployed in second frequency band 302. As illustrated by first frequency band 300, GSM can be fragmented or non-contiguous within the first frequency band 300. It should be noted that the fragmentation of GSM within first frequency band 300 is for example purposes only and different allocations of GSM within first frequency band 300 are possible and all such allocations can be utilized with the disclosed aspects. For example, the non-contiguous blocks of GSM can be 200 KHz blocks or other size blocks (e.g., 400 KHz blocks, 800 KHz blocks, and so forth). In related aspects, FIG. 3B provides a schematic representation of another embodiment of non-contiguous channel aggregation, showing a first frequency band 310 for a first RAT (e.g., GSM) and a second frequency band 312 for a second RAT (e.g., LTE).

With reference once again to FIG. 2, the communications apparatus 202 can include a control component 204 that is configured to create a mode, referred to as Carrier Aggregation (CA) mode 206 in LTE. CA mode 206 can provide or allow control of non-contiguous 200 KHz chunks of GSM in a first band 300 (shown in FIG. 3A) from a separate native LTE carrier in second band 302 (shown in FIG. 3A). It is noted that the resulting LTE CA mode allows for the aggregation of multiple carriers (e.g., 200 KHz carriers) with a native LTE carrier. It is further noted that little, if any, control overhead is needed, which can provide more efficient movement from the first RAT (e.g., GSM) to the second RAT (e.g., LTE).

With respect to carrier aggregation, LTE-A UEs may use spectrum in 20 Mhz bandwidths allocated in a carrier aggregation of up to a total of 100 Mhz (five component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Figure 12A:
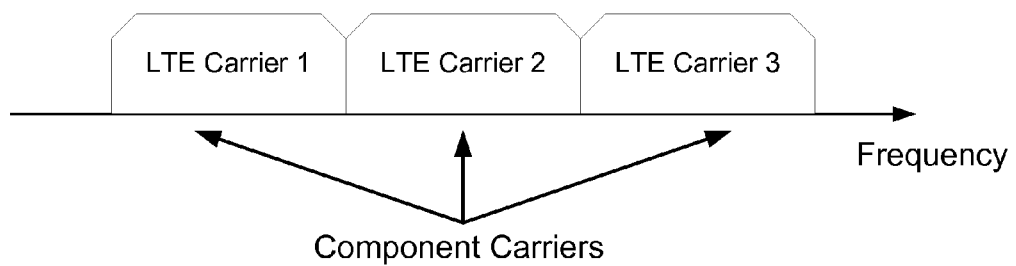
FIG. 12A illustrates an example of continuous carrier aggregation.
Figure 12B:
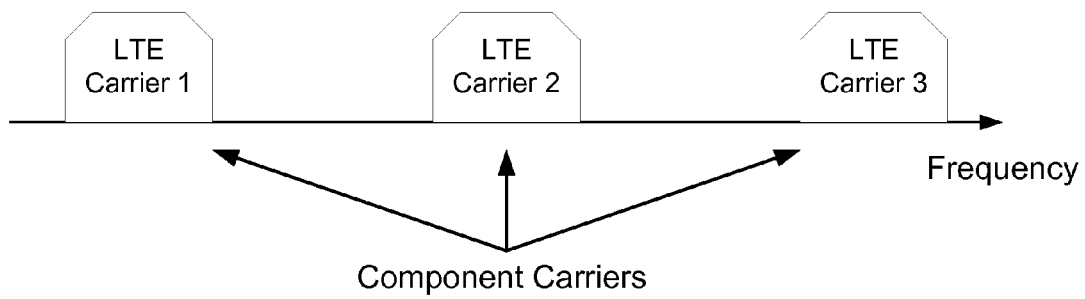
FIG. 12B illustrates an example of non-continuous carrier aggregation.

For the LTE-A mobile systems, two types of carrier aggregation (CA) methods have been proposed, continuous CA and non-continuous CA. They are illustrated in FIGS. 12A and 12B. Non-continuous CA occurs when multiple available component carriers are separated along the frequency band (FIG. 12B). On the other hand, continuous CA occurs when multiple available component carriers are adjacent to each other (FIG. 12A). Both non-continuous and continuous CA aggregate multiple LTE/component carriers to serve a single unit of LTE Advanced UE.

Multiple RF receiving units and multiple FFTs may be deployed with non-continuous CA in LTE-A UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, techniques may be used to adaptively adjust coding, modulation and transmission power for different component carriers. For example, in an LTE-A system where the eNB has fixed transmitting power on each component carrier, the effective coverage or supportable modulation and coding of each component carrier may be different.

According to an aspect of this disclosure, the control component 204 (and/or at least one processor 212 that acts in response to instructions related to controlling stored in a memory 210 as described below) may be configured to control non-contiguous and/or contiguous spectrum blocks with a selected granularity (e.g., less than 5 MHz). In related aspects, the instructions related to controlling may include instructions related to controlling non-contiguous 200 KHz spectrum blocks. In one example, the first RAT is GSM and the second RAT is LTE, wherein the first RAT is in a first frequency band and the second RAT is in a second frequency band, and wherein the controlling is performed by a separate native LTE carrier in the second frequency band.

It is noted that control of the spectrum blocks may involve sending grant/control information to the UE, so that the UE knows where to obtain UE data. The grant/control information may include, for example, scheduling grant(s). In LTE, the first three symbols may be reserved for control, such that the UE may determine if it is scheduled to receive data by looking at the first symbols. In GSM, carriers do not typically carry such grant/control information; rather, scheduling grant(s) or the like are sent another way. In GSM, control channels may be divided into three categories: Broadcast Control Channel (BCCH), Common Control Channel (CCCH), and Dedicated Control Channels (DCCH). The DCCH is a single timeslot on an RF carrier that is used to convey eight Stand-alone Dedicated Control Channels (SD-CCHs). As such, in GSM, UEs do not monitor GSM carriers to obtain control information. Thus, when a portion/block of the GSM frequency band/spectrum gets reallocated to LTE, the UE may monitor the native LTE carrier to obtain the control information if the UE has been scheduled to receive UE data in the reallocated spectrum block. Stated another way, in a multi-access system such as LTE, the UE may be configured to monitor the native carrier in order to receive the grant/control information if the UE is scheduled to receive data in the reallocated spectrum block.

Figure 3C:
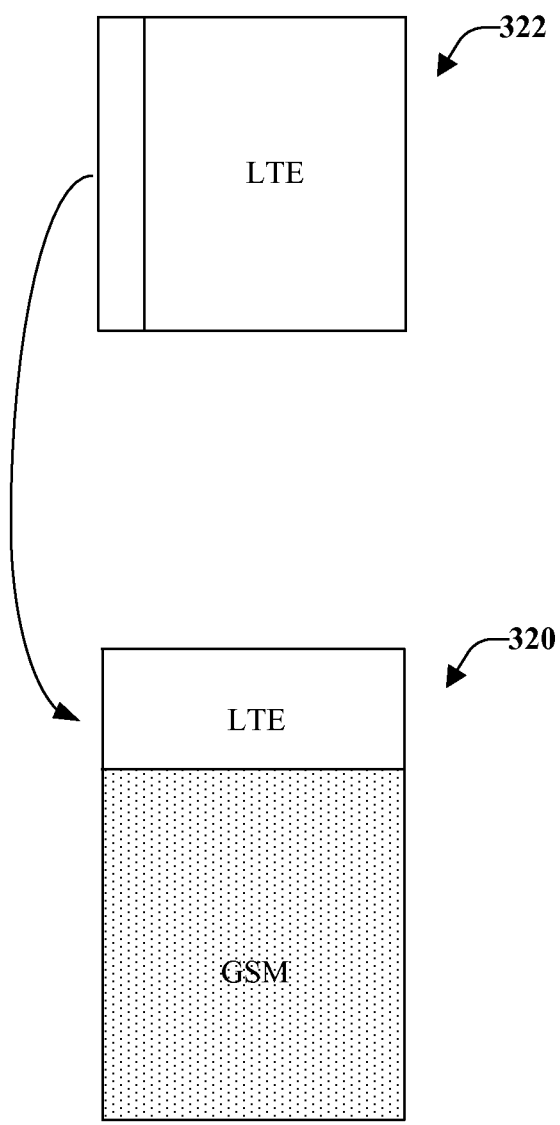
FIG. 3C provides a schematic representation of contiguous channel aggregation.

In related aspects, with reference to FIG. 3C, there is provided a schematic representation of contiguous channel aggregation. Illustrated are a first frequency band 320 for a first RAT (e.g., an older RAT such as GSM or the like) and a second frequency band 322 for a second RAT (e.g., a new RAT such as LTE or the like). In contrast to non-contiguous channel aggregation shown in FIG. 3A, the contiguous channel aggregation shown in FIG. 3C results in single, larger frequency block allocated for the second RAT. In related aspects, the spectrum block (initially allocated to the first RAT) reallocated to the second RAT may be a contiguous chunk that may be combined with another spectrum block to make-up the required minimum spectrum block (e.g., 20 MHz) for carrier aggregation. For example, a 1 MHz contiguous chunk from the GSM frequency band may be combined with a 19 MHz non-contiguous GSM chunk to make-up 20 MHz for carrier aggregation.

Also included in communications apparatus 202 is a frequency reuse component 208 that is configured to utilize a re-use of one with spectrum moved to LTE, which can provide a gain in spectral efficiency for the moved spectrum. Frequency reuse refers to the ability to re-use frequencies (and channels) to increase both coverage and capacity (or spectral efficiency) of a communication network. Adjacent cells in the communication network (wherein the communication network includes a plurality of cells), utilize different frequencies. Cells that are far enough apart can reuse the same frequency.

Figure 4:
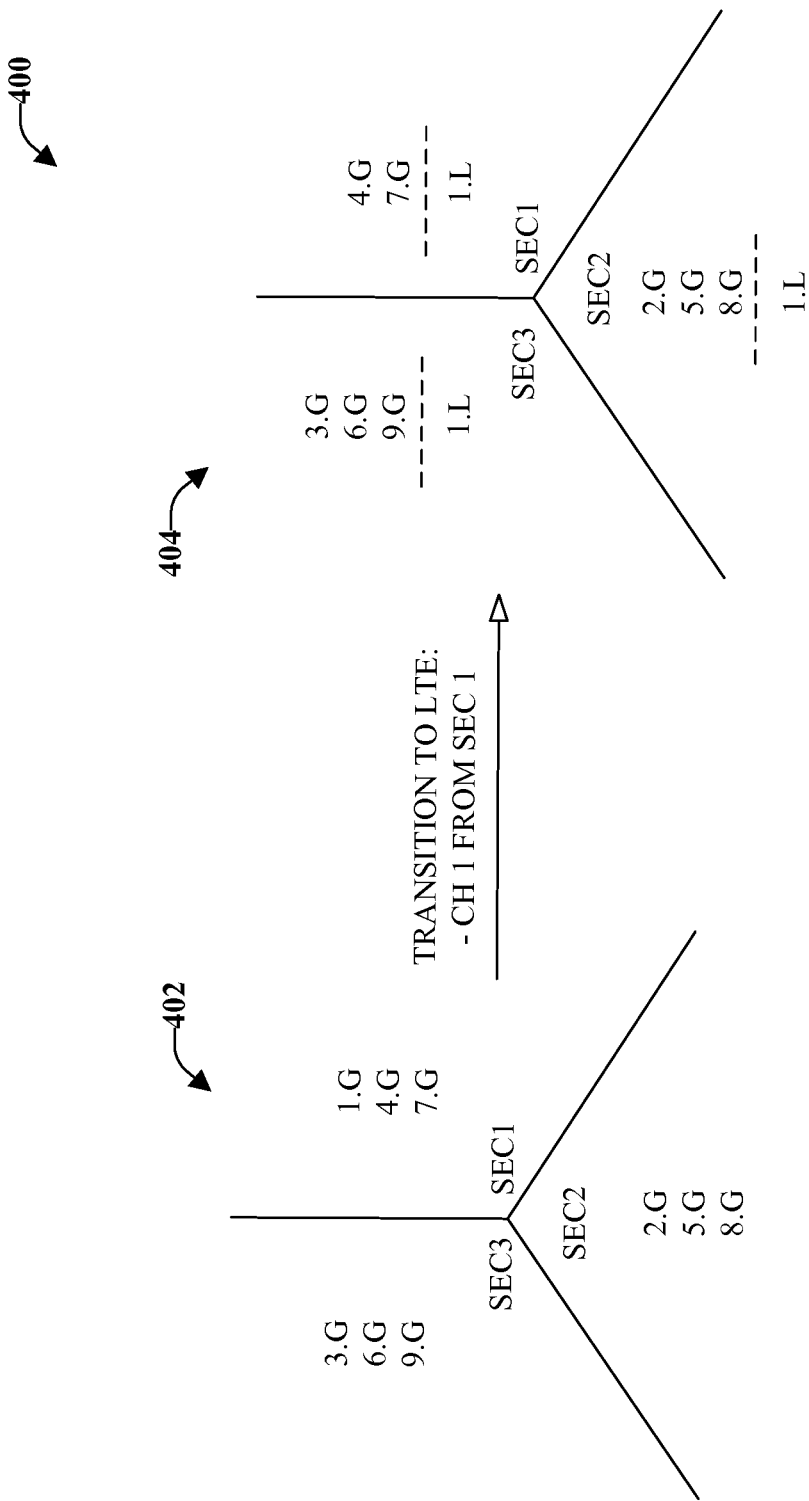
FIG. 4 shows GSM channels in a three-sector site with frequency reuse.

FIG. 4 illustrates GSM channels in a three-sector site with a frequency reuse of three. Typical reuse factors vary between three and nine, as shown at 402. Spectrum transitions to LTE can be utilized with a frequency reuse of one, as shown at 404. Thus, there can be a gain in spectral efficiency realized for the transitioned spectrum. A frequency reuse of one allows adjacent cells to use the same frequencies, wherein a different criteria, other than frequency, is used (such as codes). For example, in GSM, with a frequency reuse of one, the adjacent cells would use a different Timing Sequence Code (TSC) to allow the receiver to cancel out noise from the other cells using the same frequency.

In accordance with some aspects, there can be an impact on frequency hopping, when applicable, with the one or more disclosed aspects. In related aspects, the more channels that are moved in a sector, the less frequencies there might be available to hop. For example, GSM may use frequency hopping to improve signal quality by allowing frequency diversity. Here, the aim may be to use GSM frequencies that are not too close to each other to get maximum benefit from frequency diversity (but still within the same GSM band). Accordingly, when reallocating some frequency blocks from the GSM spectrum for use by LTE, it is important to ensure the maximum possible gap between frequencies left for GSM.

According to some aspects, non-contiguous channel aggregation can incur additional overhead (due to Channel Quality Indicator (CQI) feedback). However, non-contiguous channel aggregation can allow more freedom in the removal of frequencies from various deployments. Non-contiguous channel aggregation can also provide smart removal of frequencies to mitigate the impact on frequency hopping performance.

With reference once again to FIG. 2, the system 200 can include a memory 210 operatively coupled to communication apparatus 202. The memory 210 can be external to communication apparatus 202 or can reside within communication apparatus 202. The memory 210 can store information related to deciding to migrate from a first radio access technology (RAT) to a second RAT, and controlling non-contiguous spectrum blocks that have a granularity of less than 5 MHz. The first RAT can include the non-contiguous spectrum blocks. The memory 210 can also retain instructions related to migrating to the second RAT. In accordance with some aspects, the memory 210 retains further instructions related to utilizing a frequency reuse of one.

The memory 210 can store protocols associated with efficient use of frequency bands, taking action to control communication between communication apparatus 202 other devices or nodes, such that system 200 can employ stored protocols and/or algorithms to achieve improved communications in a wireless network as described herein. It should be appreciated that the memory or data store components described herein can be either volatile memory or nonvolatile memory, or can include both volatile and/or nonvolatile memory.

At least one processor 212 can be operatively connected to communication apparatus 202 (and/or memory 210) to facilitate analysis of information related to more efficient use of frequency bands in a communication network. The at least one processor 212 can be a processor dedicated to analyzing and/or generating information received by communication apparatus 202, a processor that controls one or more components of system 200, and/or a processor that both analyzes and generates information received by communication apparatus 202 and controls one or more components of system 200.

In accordance with some aspects, the at least one processor 212 may be configured to enable soft migration of technologies (i.e., reallocation of a portion of a first frequency band allocated to a first RAT to a second RAT). The at least one processor 212 can include a first module that decides to migrate from a first RAT to a second RAT. The at least one processor 212 can also include a second module that controls non-contiguous spectrum blocks that have a granularity of less than 5 MHz, wherein the first RAT includes the non-contiguous spectrum blocks. Further, the at least one processor 212 can include a third module for migrating to the second RAT. In accordance with some aspects, the second module may control non-contiguous spectrum blocks with a granularity of less than 5 MHz. According to some aspects, the second module may control non-contiguous 200 KHz spectrum blocks.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
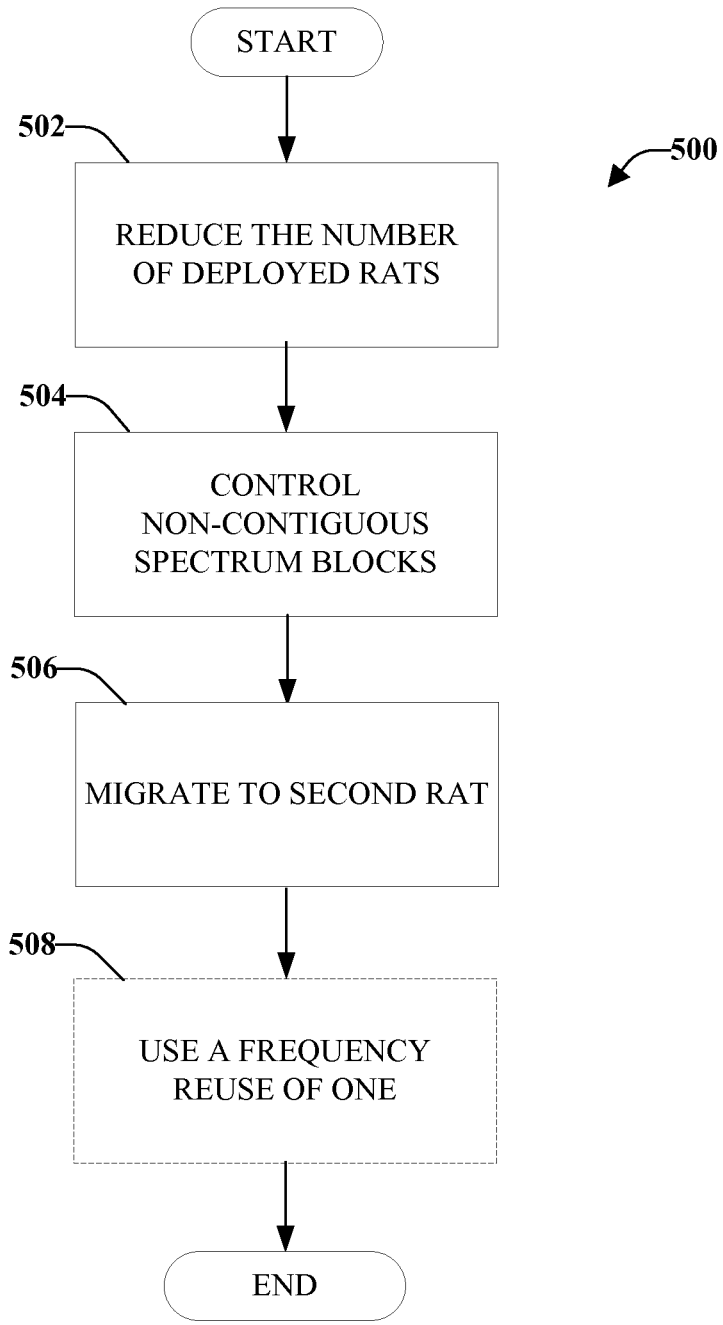
FIG. 5 illustrates an example methodology for providing efficient use of frequency bands.

FIG. 5 illustrates a method that provides efficient use of frequency bands, according to an aspect of this disclosure. Method 500 starts, at 502, when it is decided to reduce the number of deployed technologies. To reduce the number, it may be decided to migrate from a first RAT to a second RAT. In accordance with some aspects, the first RAT is global system for mobiles and the second RAT is LTE.

At 504, non-contiguous spectrum blocks that have a granularity of less than 5 MHz are controlled. The non-contiguous spectrum blocks are included in the first RAT. Controlling may involve controlling non-contiguous spectrum blocks with a granularity of less than 5 MHz. In accordance with some aspects, controlling may involve controlling non-contiguous 200 KHz spectrum blocks.

Migration to the second RAT occurs, at 506. In accordance with some aspects, method 500 also includes, at 508, utilizing a frequency reuse of one. According to some aspects, the first RAT is in a first frequency band and the second RAT is in a second frequency band, and the controlling is performed by a separate native LTE carrier in the second frequency band.

In accordance with some aspects, a computer program product can include a computer-readable medium that may include codes for carrying out various aspects of method 500. Computer-readable medium can include a first set of codes for causing a computer to decide to migrate from a first RAT to a second RAT. Also included in computer-readable medium is a second set of codes for causing the computer to control non-contiguous spectrum blocks that have a granularity of less than 5 MHz, wherein the first RAT may include the non-contiguous spectrum blocks. Further, computer-readable medium may include a third set of codes for causing the computer to migrate to the second RAT. In accordance with some aspects, computer-readable medium may include a fourth set of codes for causing the computer to utilize a frequency reuse of one. In accordance with some aspects, the second set of codes controls non-contiguous spectrum blocks with a granularity of less than 5 MHz. According to some aspects, the second set of codes controls non-contiguous 200 KHz spectrum blocks.

Figure 6:
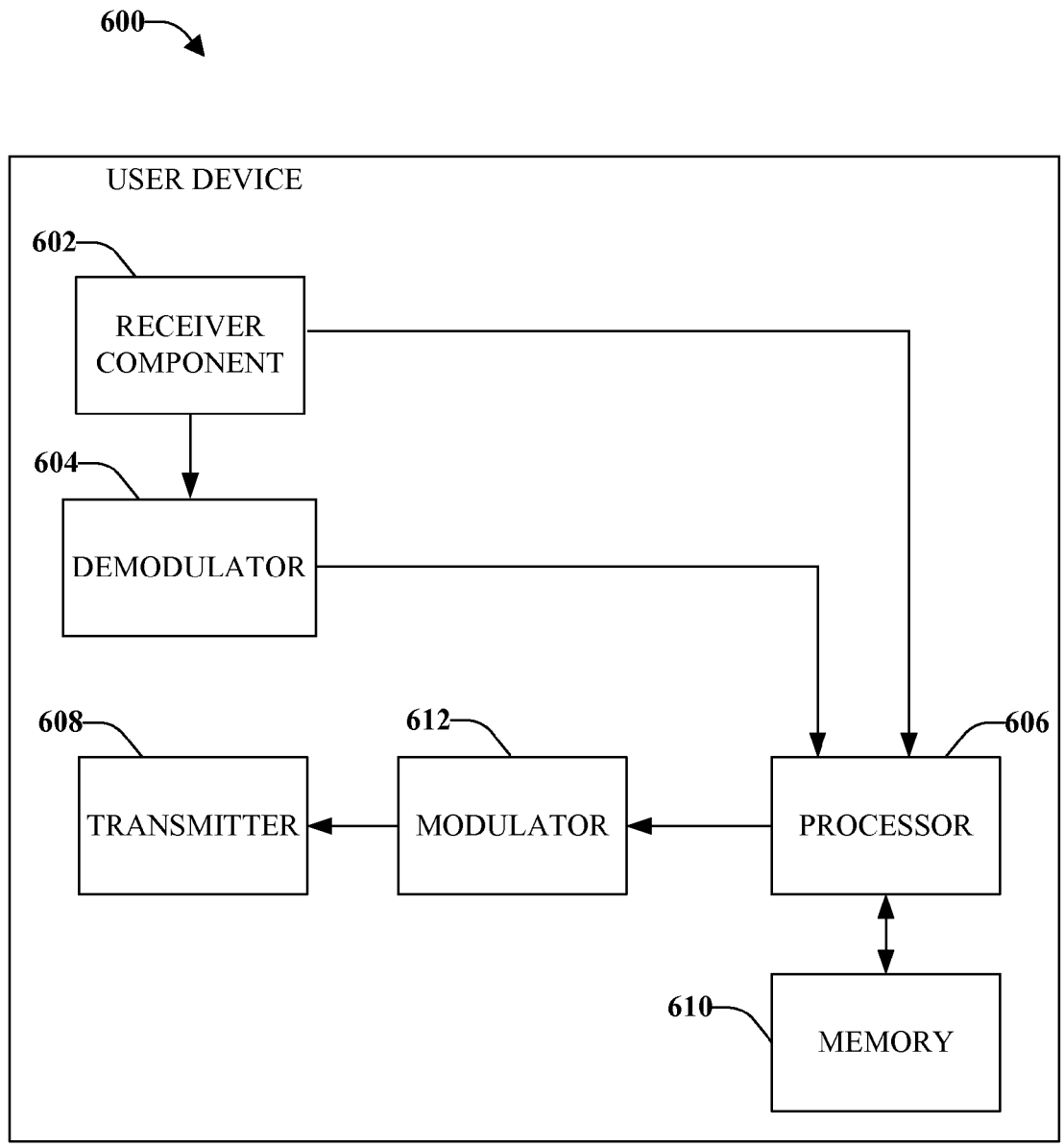
FIG. 6 illustrates a system that facilitates soft migration of technologies, in accordance with one or more aspects presented herein.

With reference to FIG. 6, illustrated is a system 600 that facilitates soft migration of technologies in accordance with one or more of the disclosed aspects. The system 600 may reside in a user device (e.g., a UE or the like). The system 600 may include a receiver component 602 that can receive a signal from, for example, a receiver antenna. The receiver component 602 may perform actions thereon, such as filtering, amplifying, down-converting, etc. of the received signal. The receiver component 602 may also digitize the conditioned signal to obtain samples. A demodulator 604 may obtain received symbols for each symbol period, as well as provide received symbols to a processor 606.

The processor 606 can be a processor dedicated to analyzing information received by the receiver component 602 and/or generating information for transmission by a transmitter 608. In addition or alternatively, the processor 606 can control one or more components of the system 600, analyze information received by the receiver component 602, generate information for transmission by the transmitter 608, and/or control one or more components of the system 600. The processor 606 may include a controller component capable of coordinating communications with additional user devices.

The system 600 can additionally include a memory 610 operatively coupled to the processor 606. The memory 610 can store information related to coordinating communications and any other suitable information. The memory 610 can additionally store protocols associated with spectrum allocation. The system 600 can further include a symbol modulator 612, wherein the transmitter 608 transmits the modulated signal.

Figure 7:
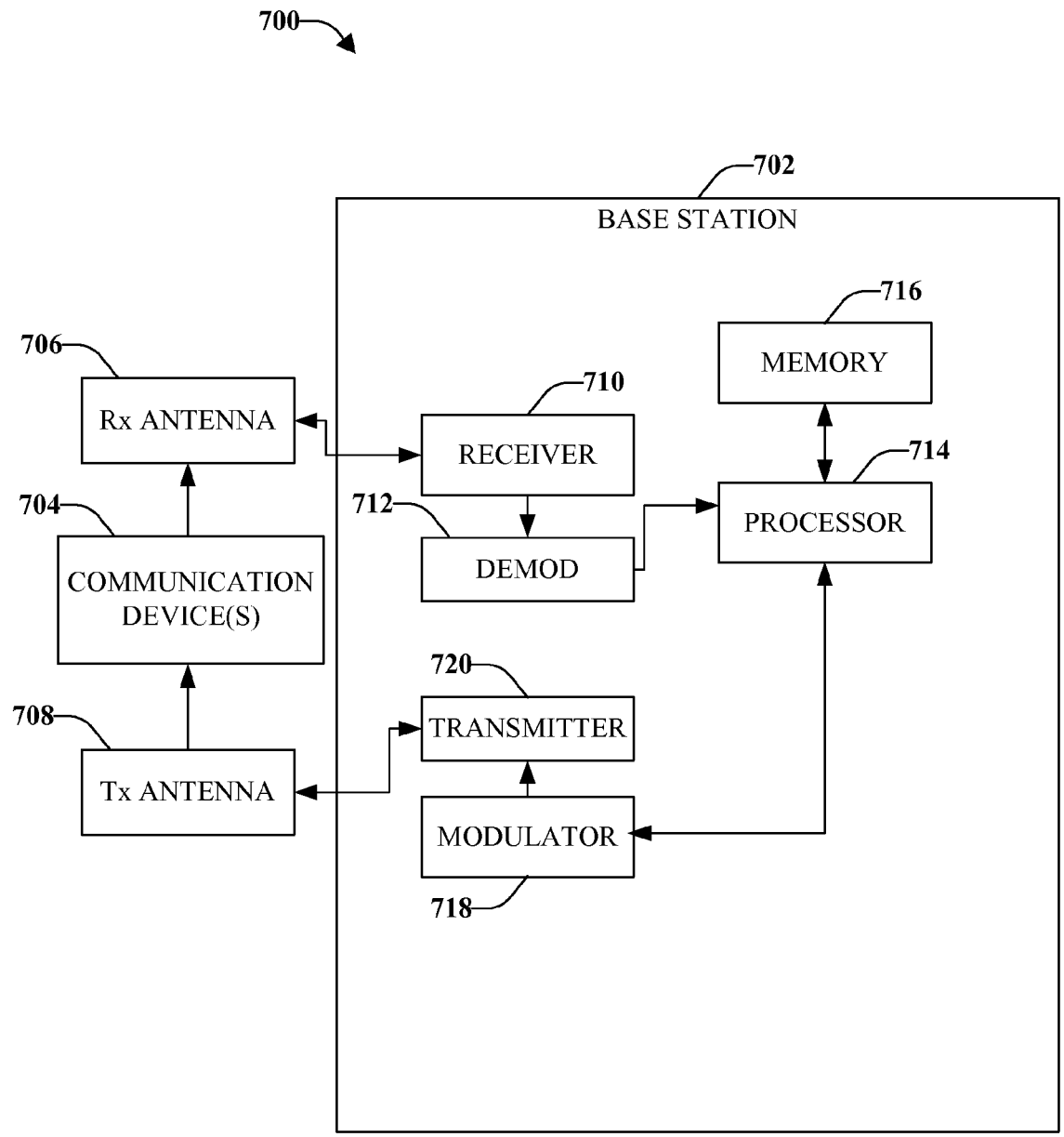
FIG. 7 is an illustration of a system that facilitates soft migration of technologies to provide for more efficient use of frequency bands, in accordance with one or more aspects presented herein.

FIG. 7 is an illustration of a system 700 that facilitates soft migration of technologies to provide for more efficient use of frequency bands in accordance with various aspects described herein. The system 700 may include an access point or base station 702. As illustrated, base station 702 receives signal(s) from one or more communication device(s) 704 (e.g., user device) by a receive antenna 706, and transmits to the one or more communication device(s) 704 through a transmit antenna 708.

Base station 702 may include a receiver 710 that receives information from receive antenna 706 and is operatively associated with a demodulator 712 that demodulates received information. Demodulated symbols are analyzed by a processor 714 that is coupled to a memory 716 that stores information related to spectrum allocation in a communication environment. A modulator 718 can multiplex the signal for transmission by a transmitter 720 through the transmit antenna 708 to the communication device(s) 704.

Figure 8:
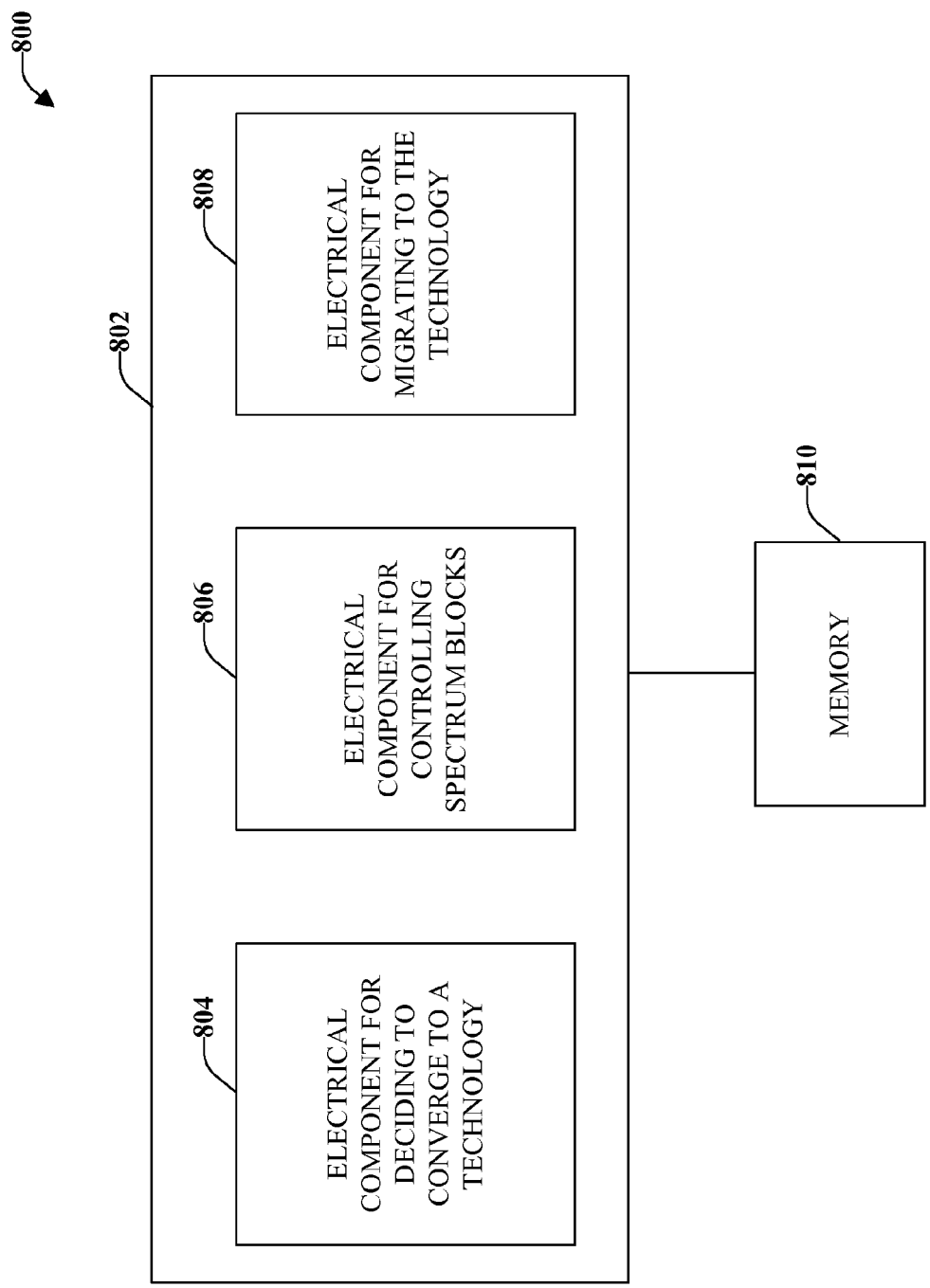
FIG. 8 illustrates an example system that controls the use of frequency bands, according to an aspect of this disclosure.

With reference to FIG. 8, illustrated is an example apparatus/system 800 that controls the use of frequency bands, according to an aspect of this disclosure. The system 800 may reside at least partially within a network node. It is to be appreciated that system 800 is represented as including functional blocks, which may be functional blocks that represent functions implemented by a processor, software, or combination thereof (e.g., firmware).

The system 800 may include a logical grouping 802 of electrical components that can act separately or in conjunction. The logical grouping 802 may include an electrical component 804 for deciding to migrate from a first RAT (e.g., GSM) to a second RAT (e.g., LTE). In accordance with some aspects, the decision may involve deciding to move from utilizing three or more technologies in a frequency band to only using one or two technologies in that band.

Also included in the logical grouping 802 is an electrical component 806 for controlling non-contiguous spectrum blocks that have a granularity of less than a given value (e.g., 5 MHz), wherein the first RAT may include the non-contiguous spectrum blocks. In accordance with some aspects, the electrical component 806 may include an electrical component for controlling non-contiguous spectrum blocks with a granularity of less than 5 MHz. According to some aspects, the electrical component 806 may include an electrical component for controlling non-contiguous 200 KHz spectrum blocks or the like.

Also included is an electrical component 808 for migrating to the second RAT. In accordance with some aspects, the logical grouping 802 may include an electrical component for utilizing a frequency reuse of one. The first RAT can be in a first frequency band and the second RAT can be in a second frequency band, and the controlling may be performed by a separate native LTE carrier or the like in the second frequency band.

Additionally, the system 800 may include a memory 810 that retains instructions for executing functions associated with the components 804, 806, and 808 or other components. While shown as being external to the memory 810, it is to be understood that one or more of the 804, 806, and 808 may exist within the memory 810.

Figure 9:
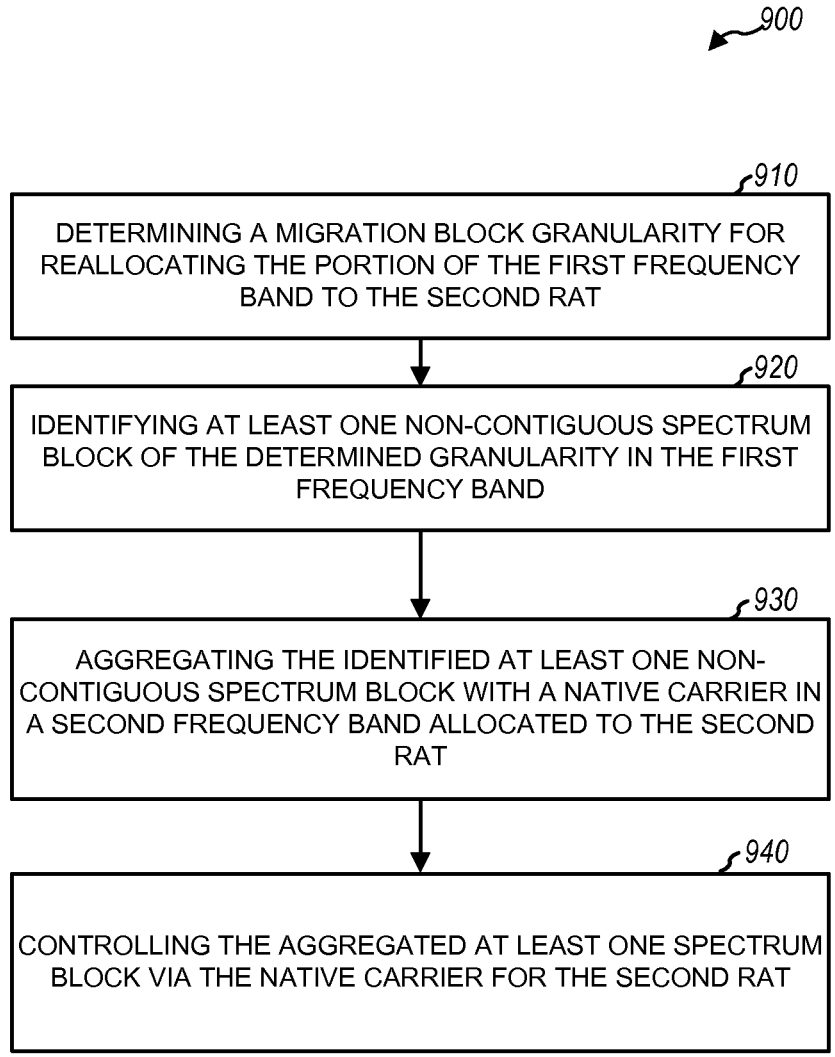
FIG. 9 illustrates an example soft RAT migration methodology executable by at least one network entity.

In accordance with one or more aspects of the subject of this disclosure, FIG. 9 shows an embodiment of a method 900 for soft migration from a first RAT (e.g., GSM) to a second RAT (e.g., LTE) in a wireless communication network. The method 900 may be performed by at least one network entity, such as, for example, at least one E-UTRA network element, at least one EPC network element, or the like, or combinations thereof. In related aspects, the at least one E-UTRA network element may include an eNB or component(s) thereof. In further related aspects, the EPC network element may include an MME, an HSS, a PCRF server, an SGW, and/or a PGW, or component(s) thereof. The at least one network entity may also be a server or another computing device configured to interface with one or more of the above mentioned E-UTRA network elements and/or EPC network elements.

For example, the method 900 may involve, at 910, determining a migration block granularity for reallocating the portion of the first frequency band to the second RAT. The method 900 may involve, at 920, identifying at least one non-contiguous spectrum block of the determined granularity in the first frequency band. The method 900 may involve, at 930, aggregating the identified at least one non-contiguous spectrum block with a native carrier in a second frequency band allocated to the second RAT. The method 900 may involve, at 940, controlling the aggregated at least one spectrum block via the native carrier for the second RAT.

Figure 10:
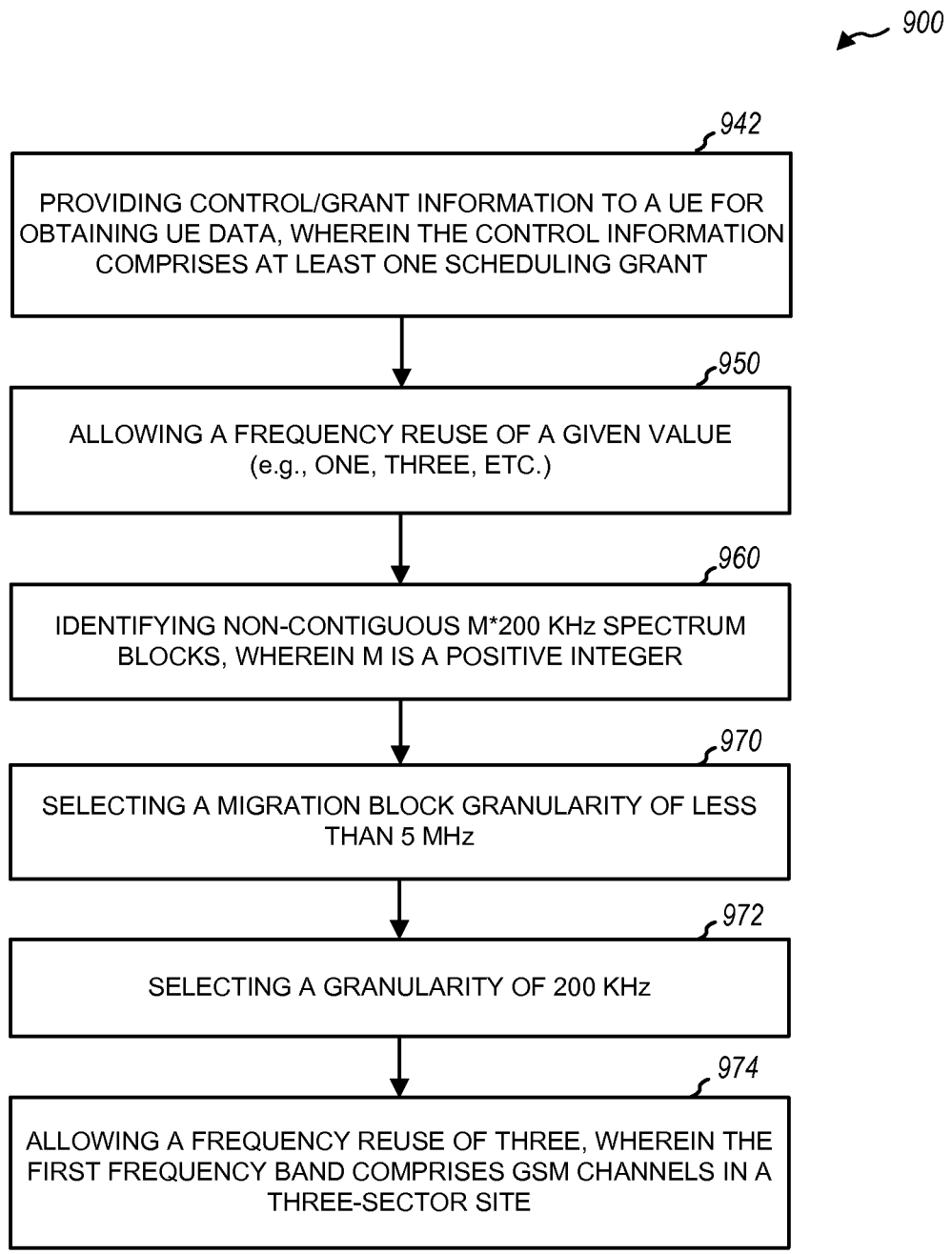
FIG. 10 illustrates further aspects of the methodology of FIG. 9.

With reference to FIG. 10, there are shown further operations or aspects of method 900 that are optional and may be performed by one or more network entities for soft migration from the first RAT to a second RAT. If the method 900 includes at least one block of FIG. 9, then the method 900 may terminate after the at least one block, without necessarily having to include any subsequent downstream block(s) that may be illustrated. It is further noted that numbers of the blocks do not imply a particular order in which the blocks may be performed according to the method 900. For example, controlling may involve, at 942, providing control/grant information to a UE for obtaining UE data, wherein the control information comprises at least one scheduling grant. In another example, the method 900 may further involve, at 950, allowing a frequency reuse of a given value (e.g., one, three, etc.).

In related aspects, identifying may involve, at 960, identifying non-contiguous N*200 KHz spectrum blocks, wherein N is a positive integer. In further related aspects, the first RAT may be GSM or the like, and the second RAT may be LTE or the like. Determining may involve, at 970, selecting a migration block granularity of less than 5 MHz. Selecting may involve, at 972, selecting a granularity of 200 KHz. The method may further involve, at 974, allowing a frequency reuse of three, wherein the first frequency band comprises GSM channels in a three-sector site.

Figure 11:
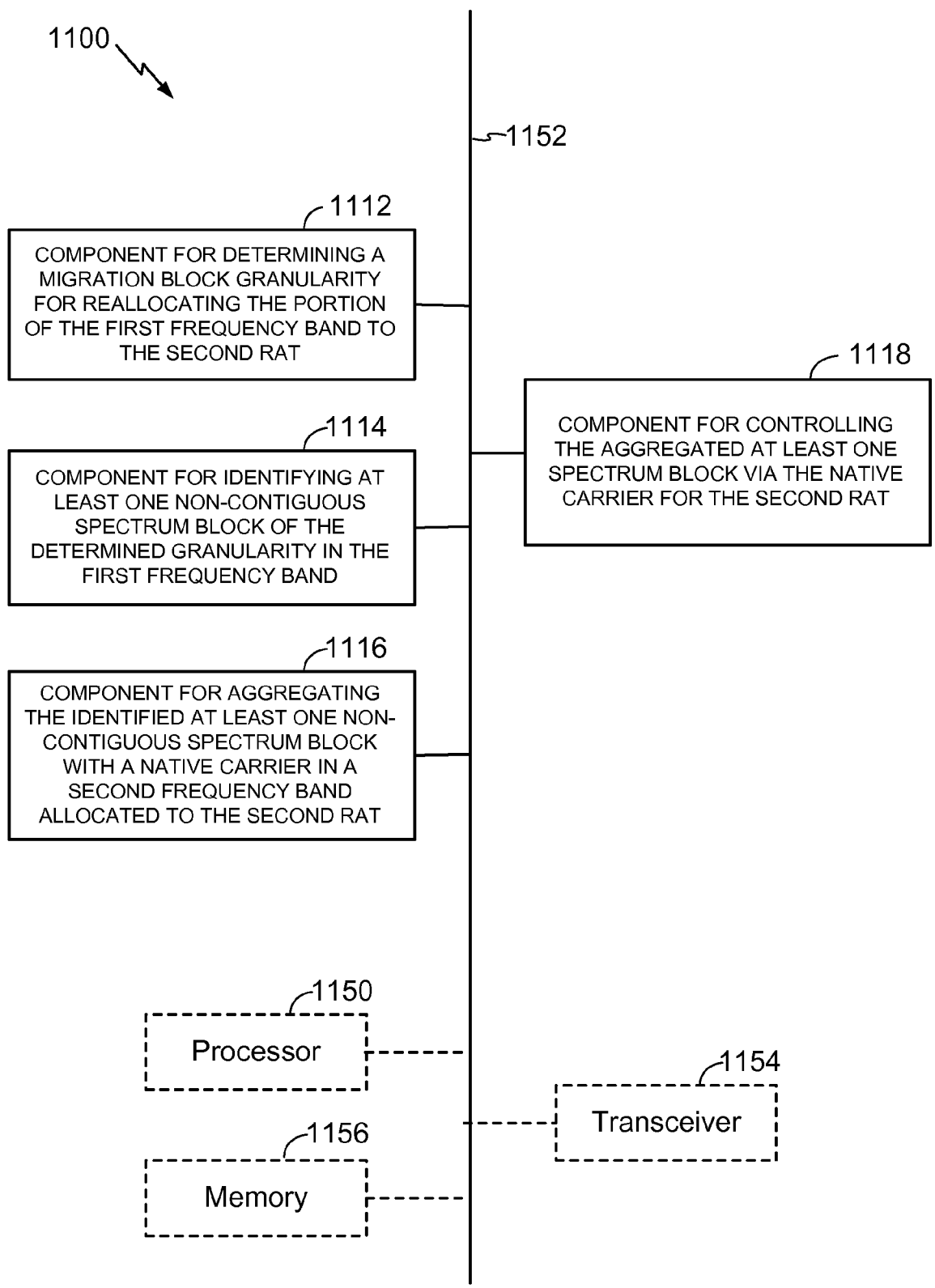
FIG. 11 shows an example apparatus for soft RAT migration, in accordance with the methodology of FIGS. 9-10.

In accordance with one or more aspects of the embodiments described herein, there are provided devices and apparatuses for soft migration of frequency spectrum blocks from a first RAT to a second RAT, as described above with reference to FIGS. 9-10. With reference to FIG. 11, there is provided an exemplary apparatus 1100 that may be configured as a network entity or the like in a wireless network, or as a processor or similar device for use within the network entity, for supporting communication. The apparatus 1100 may include functional blocks that can represent functions implemented by a processor, software, or combination thereof.

For example, the apparatus 1100 may include: an electrical component 1112 for determining a migration block granularity for reallocating the portion of the first frequency band to the second RAT; an electrical component 1114 for identifying at least one non-contiguous spectrum block of the determined granularity in the first frequency band; an electrical component 1116 for aggregating the identified at least one non-contiguous spectrum block with a native carrier in a second frequency band allocated to the second RAT; and an electrical component 1118 for controlling the aggregated at least one spectrum block via the native carrier for the second RAT.

In related aspects, the apparatus 1100 may optionally include a processor component 1150 having at least one processor, in the case of the apparatus 1100 configured as a network entity, rather than as a processor. The processor 1150, in such case, may be in operative communication with the components 1112-1118 via a bus 1152 or similar communication coupling. The processor 1150 may effect initiation and scheduling of the processes or functions performed by electrical components 1112-1118.

In further related aspects, the apparatus 1100 may include a radio transceiver component 1154. A stand alone receiver and/or stand alone transmitter may be used in lieu of or in conjunction with the transceiver 1154. The apparatus 1100 may optionally include a component for storing information, such as, for example, a memory device/component 1156. The computer readable medium or the memory component 1156 may be operatively coupled to the other components of the apparatus 1100 via the bus 1152 or the like. The memory component 1156 may be adapted to store computer readable instructions and data for effecting the processes and behavior of the components 1112-1118, and subcomponents thereof, or the processor 1150, or the methods disclosed herein. The memory component 1156 may retain instructions for executing functions associated with the components 1112-1118. While shown as being external to the memory 1156, it is to be understood that the components 1112-1118 can exist within the memory 1156. It is further noted that the modules in FIG. 11 may comprise processors, electronic devices, hardware devices, electronic components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A soft migration method for reallocating a portion of a first frequency band allocated to a first radio access technology (RAT) to a second RAT in a wireless communication network, comprising:
   determining a migration block granularity for reallocating the portion of the first frequency band to the second RAT;
   a plurality of non-contiguous spectrum blocks of the determined granularity in the first frequency band, wherein the plurality of non-contiguous spectrum blocks is between a first spectrum block allocated to the first RAT and a second spectrum block allocated to the first RAT;
   aggregating the plurality of non-contiguous spectrum blocks with a native carrier of the second RAT in a second frequency band allocated to the second RAT;
   controlling the aggregated plurality of non-contiguous spectrum blocks via the native carrier of the second RAT, and wherein controlling comprises providing control information to a user equipment (UE) for obtaining UE data.

2. The method of claim 1, wherein the control information comprises at least one scheduling grant.

3. The method of claim 1, further comprising allowing a frequency reuse of one.

4. The method of claim 1, wherein identifying comprises identifying non-contiguous N*200 KHz spectrum block(s), wherein N comprises a positive integer.

5. The method of claim 1, wherein the first RAT comprises Global System for Mobile communications (GSM) and the second RAT comprises 3rd Generation Partnership Project (3GPP) Long Term Evolution (LTE).

6. The method of claim 5, wherein the determined granularity is less than 5 MHz.

7. The method of claim 6, wherein the determined granularity is 200 KHz.

8. The method of claim 5, further comprising allowing a frequency reuse of three, wherein the first frequency band comprises GSM channels in a three-sector site.

9. A wireless communication apparatus for reallocating a portion of a first frequency band allocated to a first radio access technology (RAT) to a second RAT in a wireless communication network, comprising:
at least one processor configured to: determine a migration block granularity for reallocating the portion of the first frequency band to the second RAT; a plurality of non-contiguous spectrum blocks of the determined granularity in the first frequency band, wherein the plurality of non-contiguous spectrum blocks is between a first spectrum block allocated to the first RAT and a second spectrum block allocated to the first RAT; aggregate the plurality of non-contiguous spectrum blocks with a native carrier of the second RAT in a second frequency band allocated to the second RAT; and control the aggregated plurality of non-contiguous spectrum blocks via the native carrier of the second RAT, wherein the at least one processor controls by providing control information to a user equipment (UE) for obtaining UE data; and
a memory coupled to the at least one processor for storing data.

10. The wireless communication apparatus of claim 9, wherein the control information comprises at least one scheduling grant.

11. The wireless communication apparatus of claim 9, wherein the at least one processor allows a frequency reuse of one.

12. The wireless communication apparatus of claim 9, wherein the at least one processor identifies by identifying non-contiguous N*200 KHz spectrum block(s), wherein N comprises a positive integer.

13. The wireless communication apparatus of claim 9, wherein the first RAT comprises Global System for Mobile communications (GSM) and the second RAT comprises 3rd Generation Partnership Project (3GPP) Long Term Evolution (LTE).

14. The wireless communication apparatus of claim 13, wherein the determined granularity is less than 5 MHz.

15. The wireless communication apparatus of claim 14, wherein the determined granularity is 200 KHz.

16. The wireless communication apparatus of claim 13, wherein the at least one processor allows a frequency reuse of three, wherein the first frequency band comprises GSM channels in a three-sector site.

17. The wireless communication apparatus of claim 9, wherein apparatus comprises at least one network entity.

18. The wireless communication apparatus of claim 9, wherein the at least one network entity comprises an evolved Node B (eNB).

19. A wireless communication apparatus for reallocating a portion of a first frequency band allocated to a first radio access technology (RAT) to a second RAT in a wireless communication network, comprising:
means for determining a migration block granularity for reallocating the portion of the first frequency band to the second RAT;
means for a plurality of non-contiguous spectrum blocks of the determined granularity in the first frequency band, wherein the plurality of non-contiguous spectrum blocks is between a first spectrum block allocated to the first RAT and a second spectrum block allocated to the first RAT;
means for aggregating the plurality of non-contiguous spectrum blocks with a native carrier of the second RAT in a second frequency band allocated to the second RAT;
means for controlling the plurality of non-contiguous spectrum blocks via the native carrier of the second RAT; and
means for providing control information to a user equipment (UE) for obtaining UE data.

20. The wireless communication apparatus of claim 19, wherein the control information comprises at least one scheduling grant.

21. The wireless communication apparatus of claim 19, further comprising means for allowing a frequency reuse of one.

22. The wireless communication apparatus of claim 19, wherein: the first RAT comprises Global System for Mobile communications (GSM) and the second RAT comprises 3rd Generation Partnership Project (3GPP) Long Term Evolution (LTE); and the determined granularity is less than 5 MHz.

23. The wireless communication apparatus of claim 19, further comprising means for identifying non-contiguous N*200 KHz spectrum block(s), wherein N comprises a positive integer.

24. A computer program product for reallocating a portion of a first frequency band allocated to a first radio access technology (RAT) to a second RAT in a wireless communication network, comprising:
a non-transitory computer-readable medium comprising code for causing a computer to:
determine a migration block granularity for reallocating the portion of the first frequency band to the second RAT;
a plurality of non-contiguous spectrum blocks of the determined granularity in the first frequency band, wherein the plurality of non-contiguous spectrum blocks is between a first spectrum block allocated to the first RAT and a second spectrum block allocated to the first RAT;
aggregate the plurality of non-contiguous spectrum blocks with a native carrier of the second RAT in a second frequency band allocated to the second RAT;
control the aggregated plurality of non-contiguous spectrum blocks via the native carrier of the second RAT; and
wherein the non-transitory computer-readable medium comprising code for causing the computer to provide control information to a user equipment (UE) for obtaining UE data.

25. The computer program product of claim 24, wherein the control information comprises at least one scheduling grant.

26. The computer program product of claim 24, wherein the non-transitory computer-readable medium comprising code for causing the computer to allow a frequency reuse of one.

27. The computer program product of claim 24, wherein:
the first RAT comprises Global System for Mobile communications (GSM) and
the second RAT comprises 3rd Generation Partnership Project (3GPP) Long Term Evolution (LTE); and
the determined granularity is less than 5 MHz.

28. The computer program product of claim 24, wherein the non-transitory computer-readable medium comprising code for causing the computer to identify non-contiguous N*200 KHz spectrum block(s), wherein N comprises a positive integer.

* * * * *